US009203722B2

(12) United States Patent
Parker

(10) Patent No.: US 9,203,722 B2
(45) Date of Patent: Dec. 1, 2015

(54) IDENTIFYING AND FORECASTING NETWORK CONDITIONS USING REAL-TIME RADIO ACCESS NETWORK (RAN) MODELING

(75) Inventor: Benjamin J. Parker, Vacaville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 465 days.

(21) Appl. No.: 13/076,711

(22) Filed: Mar. 31, 2011

(65) Prior Publication Data
US 2012/0250570 A1 Oct. 4, 2012

(51) Int. Cl.
*H04L 12/26* (2006.01)
(52) U.S. Cl.
CPC ................... *H04L 43/0882* (2013.01)
(58) Field of Classification Search
USPC .............. 370/229, 230, 230.1, 232, 328, 329, 370/330, 468, 437, 455, 422.1, 450, 451, 370/452.1, 452.2, 453, 50
See application file for complete search history.

(56) References Cited

U.S. PATENT DOCUMENTS

| | | | | |
|---|---|---|---|---|
| 6,496,499 B1 * | 12/2002 | Hamilton et al. | ............. | 370/348 |
| 6,603,975 B1 * | 8/2003 | Inouchi et al. | ................ | 455/450 |
| 7,324,551 B1 * | 1/2008 | Stammers | ..................... | 370/468 |
| 8,385,199 B1 * | 2/2013 | Coward et al. | ............. | 370/230.1 |
| 2003/0083073 A1 * | 5/2003 | Cossins et al. | ................ | 455/446 |
| 2005/0013287 A1 * | 1/2005 | Wallentin et al. | ............. | 370/352 |
| 2005/0014509 A1 * | 1/2005 | Semper et al. | ............. | 455/452.2 |
| 2005/0015494 A1 * | 1/2005 | Adamczyk et al. | ........... | 709/226 |
| 2005/0041584 A1 * | 2/2005 | Lau et al. | ...................... | 370/235 |
| 2005/0088972 A1 * | 4/2005 | Zhang et al. | .................. | 370/235 |
| 2008/0151817 A1 * | 6/2008 | Fitchett et al. | ................ | 370/329 |
| 2010/0002582 A1 * | 1/2010 | Luft et al. | .................. | 370/230.1 |
| 2010/0192120 A1 * | 7/2010 | Raleigh | ........................ | 717/101 |
| 2010/0214943 A1 * | 8/2010 | Immendorf et al. | .......... | 370/252 |
| 2012/0052866 A1 * | 3/2012 | Froehlich et al. | ............. | 455/445 |

OTHER PUBLICATIONS

Jacobson, Compressing TCP/IP Headers for Low-Speed Serial Links, Feb. 1990, Network Working Group RFC 1144, whole document (excerpt including cover, p. 2 and 20).*

* cited by examiner

*Primary Examiner* — Hanh N Nguyen
*Assistant Examiner* — Jose Perez

(57) ABSTRACT

A system, associated with a service provider network, is configured to monitor traffic being transported via one or more cells, within a radio access network (RAN), that serve a group user devices; obtain traffic information, associated with a cell, based on the traffic monitoring, where the traffic information includes information associated with each of the user devices, a quantity of bandwidth that corresponds to traffic flows within the cell, or one or more traffic types being served by the cell; determine that a condition exists within the cell when the quantity of bandwidth is greater than a bandwidth threshold associated with the cell; and transmit a notification that indicates that the condition exists, where the notification enables an operation to be performed on all or a portion of the traffic flows, based on a particular traffic type, to remedy the condition.

24 Claims, 8 Drawing Sheets

| UD ID 405 | SOURCE ADDRESS 410 | BASE STATION ID 415 | CELL ID 420 | UD STATUS 425 | FLOW TYPE 430 | TRAFFIC LOAD 435 | HAND IN 440 | HAND OFF 445 |
|---|---|---|---|---|---|---|---|---|
| MS1-1 | IP1 | 120-1 | 1-C1 | ACTIVE | STREAMING VIDEO | BW-1 | - | 1-C2 |
| MS1-2 | IP2 | 120-1 | 1-C2 | INACTIVE | PROGRESSIVE DOWNLOAD | DR-2 | - | - |
| MS1-3 | IP3 | 120-K | K-C1 | ACTIVE | VOICE | BW-K | BS-1 | 2-C2 |
| ... | ... | ... | | | | | | ... |

FIG. 4

IDENTIFYING AND FORECASTING NETWORK CONDITIONS USING REAL-TIME RADIO ACCESS NETWORK (RAN) MODELING

BACKGROUND

Service provider networks transport network traffic associated with a variety of services, applications, and content. The network traffic may include voice, text, video, and/or data. Service provider networks are sized and/or scaled to transport an increasing quantity of traffic that is sent by and/or received from more and more user devices and/or content providers. Additionally, the increase in the quantity of traffic corresponds to an expanding demand for various types of services, applications, and/or content.

Unfortunately, service provider networks are not always able to detect traffic conditions associated with radio access networks (RANs) via which the service provider networks communicate with the user devices. Not being able to detect the traffic conditions within the RANs may permit other conditions to develop within the service provider networks, which may cause congestion, service disruption, and/or performance degradation within the service provider networks. Additionally, not being able to detect the traffic conditions within the RAN may permit the service provider networks to operate in a manner that exacerbates the conditions within the RANs.

BRIEF DESCRIPTION OF THE DRAWINGS

FIG. 4 is a diagram of an example data structure that stores information associated with traffic being transported, to and/or from a user device, via a radio access network associated with a service provider network;

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable information, associated with traffic being transported over a radio access network (RAN), to be dynamically obtained on a real-time basis. The information, associated with the traffic, may be used to detect whether a condition exists within the RAN or is forecasted to exist at a future point in time. Based on the detection of the condition, the systems and/or methods may cause the traffic, transmitted via a service provider network with which the RAN is associated, to be transmitted to a user device in a manner that mitigates or remedies the condition.

As described herein, a RAN modeling server may perform a RAN modeling operation by monitoring traffic flowing to and/or from the service provider network via the RAN. The RAN modeling server may monitor packets, associated with the traffic, that are being transported over the RAN via cells that serve one or more user devices. The RAN modeling server may obtain information associated with the traffic based on the packet monitoring. The RAN modeling server may forward the information associated with the traffic to a content distribution system associated with the service provider network.

As also described herein, an analytics and reporting (AR) server, associated with the content distribution system, may use the information associated with the traffic to determine whether congestion and/or another condition (e.g., jitter, dropped packets, etc,) exists within the RAN. The AR server may send a notification that indicates that a condition exists within the RAN. The notification may include an instruction; to a content optimization (CO) server associated with the content distribution system, to send traffic to the one or more user devices in a manner that mitigates and/or remedies the condition. The AR server may also present the information associated with the traffic and/or information associated with the condition for display via a user interface (UI) associated with the service provider network. The UI may include geographical information and/or network topographical information associated with the service provider network.

Figure 1:
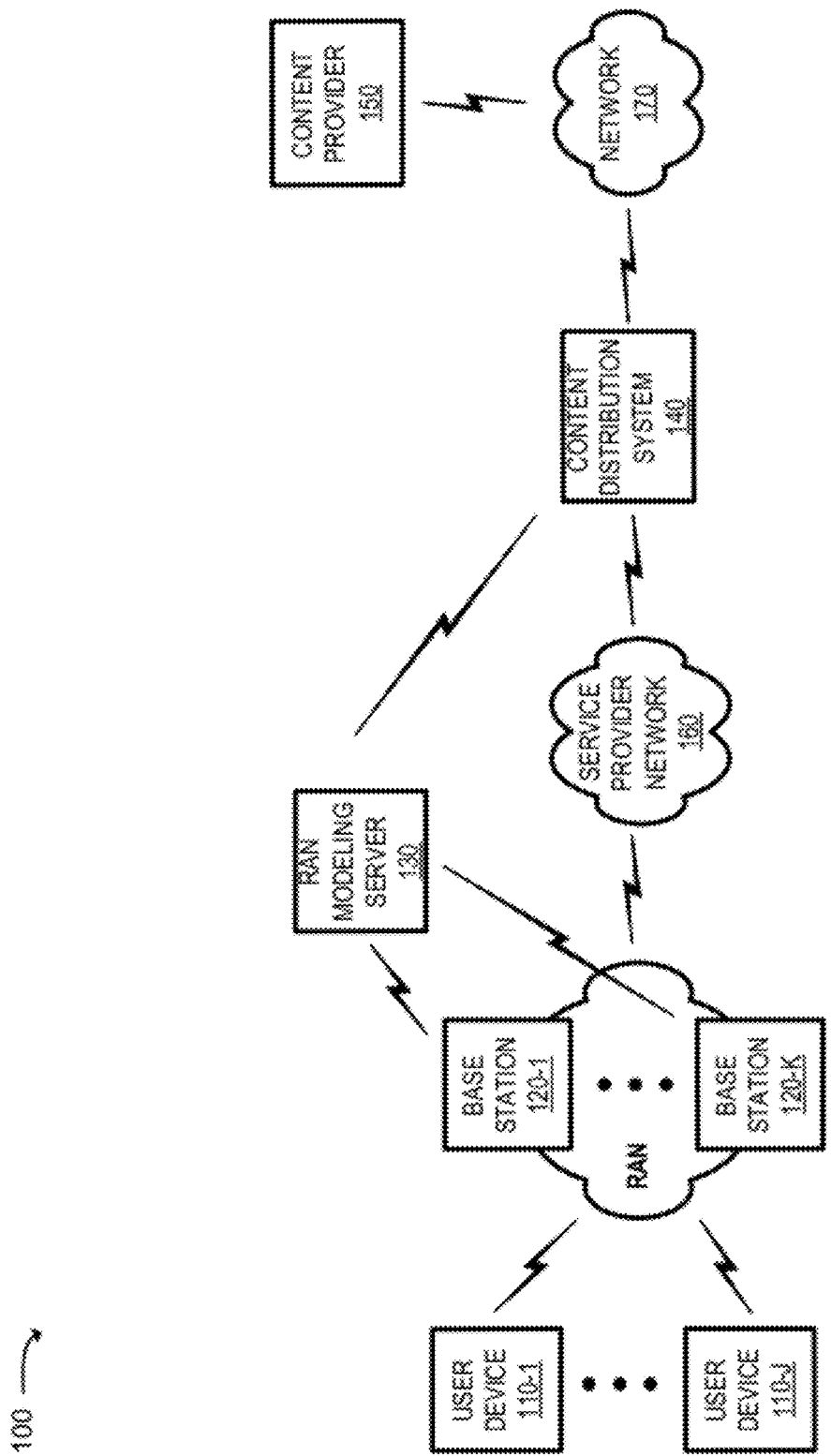
FIG. 1 is a diagram of an example environment in which systems and/or methods, described herein, may be implemented.

FIG. 1 is a diagram of an example environment 100 in which systems and/or methods described herein may be implemented. As shown in FIG. 1, environment 100 may include a group of user devices 110-1, . . . , 110-J (where J≥1) (hereinafter referred to collectively as "user devices 110" and individually as "user device 110"), a group of base stations 120-1, . . . 120-K (where K≥1) (hereinafter referred to collectively as "base stations 120" and individually as "base station 120"), a radio access network (RAN) modeling server 130 (hereinafter referred to as "RAN server 130"), a content distribution system (CDS) 140, a content provider 150, a service provider network 160 and a network 170. The number of devices, systems, and/or networks, illustrated in FIG. 1, is provided for explanatory purposes only. In practice, there may be additional devices, systems, and/or networks; fewer devices, systems, and/or networks; different devices, systems, and/or networks; or differently arranged devices, systems, and/or networks than illustrated in FIG. 1.

Also, in some implementations, one or more of the devices of environment 100 may perform one or more functions described as being performed by another one or more of the devices of environment 100. For example, RAN server 130 and CDS 140 may be integrated into a single device. Devices, systems, and/or networks of environment 100 may interconnect via wired connections, wireless connections, or a combination of wired and wireless connections.

User device 110 may include any computation or communication device, such as a wireless mobile communication device that is capable of communicating with base stations 120. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a camera, a personal gaming system, a smart phone, or another type of mobile computation or communication device.

Base station 120 may include one or more devices that receive, process, and/or transmit traffic, such as voice, video, text, and/or other data, destined for and/or received from user device 110. In one example, base station 120 may be a NodeB and/or radio network controller (RNC). In one example implementation, base station 120 may be an eNodeB within a long term evolution (LTE) network based on the Third Generation Partnership Project (3GPP) standard. As shown in FIG. 1, one or more base stations 120 may be associated with a RAN that receives traffic from and/or sends traffic to service provider network 160. Base station 120 may send traffic to and/or receive traffic from user device 110 via an air interface and may include one or more cells via which signals are received from and/or transmitted to user device 110.

RAN server 130 may include one or more server devices, or other types of computation or communication devices, that gather, process, search, store, and/or provide information in a manner similar to that described herein. RAN server 130 may, for example, monitor traffic being transported via cells associated with base station 120 to dynamically obtain information associated with the traffic being transported via base station 120. In one example, RAN server 130 may monitor one or more interfaces associated with signal bearers (such as, for example, an S1-U interface between base station 120 and a service gateway server (SGW) associated with service provider network 160) via which user device 110 communicates with service provider network 160. In another example, RAN server 130 may monitor one or more interfaces associated with control-plane signaling (such as, for example, an S11 interface between a mobility management entity (MME) server and the SGW and/or an S10 interface between the MME and another MME during, for example, a handover event). The control-plane signaling may control signal bearers during establishment or execution of a communication session associated with user device 110.

RAN server 130 may identify information associated with user device 110 from packets associated with the traffic. The information, associated with user device 110, may include a device identifier, a source address (e.g., an Internet protocol (IP) address), a status of user device 110 (e.g., active, dormant, off-line, etc.), etc. RAN server 130 may identify a type of traffic associated with user device 110 (e.g., streaming video, voice, data, etc.), information associated with a cell via which the traffic is being served to user device 110 (e.g., a cell identifier), information associated with a base station 120 with which the cell is associated (e.g., a base station identifier), etc. RAN server 130 may obtain information associated with a traffic load associated with the cell and/or base station 120 via which user device 110 is communicating. The information associated with the traffic load may identify a quantity of bandwidth, data rate, and/or throughput associated with the cell and/or base station 120. RAN server 130 may also detect handovers associated with user device 110, such as, for example, a handover into or out of the cell. RAN server 130 may transmit the information associated with the traffic to CDS 140.

CDS 140 may include one or more devices that gather, process, search, store, and/or provide information in a manner similar to that described herein. CDS 140 may perform operations associated with content distribution within environment 100. For example, CDS 140 may perform caching operations by obtaining content from content provider 150 and temporarily storing the content in a memory associated with CDS 140. CDS 140 may retrieve particular content, from the memory, in response to a request to receive the particular content from user device 110. CDS 140 may receive, from RAN server 130, information associated with traffic being transported via base station 120 to and/or from user devices 110.

CDS 140 may use the information associated with the traffic to determine whether a condition exists within the RAN via which user devices 110 communicate with service provider network 160. CDS 140 may retrieve information associated with the traffic from a prior point in time to identify trends associated with the traffic (such as, for example, whether a quantity of bandwidth associated with a cell is increasing, is decreasing, or is not changing). CDS 140 may use information associated with the trends to forecast whether a condition may occur at a future point in time.

CDS 140 may take corrective action, in response to the detection of the condition, such as by transporting content to user device 110 to remedy, mitigate, or avoid the condition. CDS 140 may, for example, cause a data rate, at which video is being streamed to user device 110, to be down-rated (e.g., decreased) in order to reduce congestion within a cell. CDS 140 may, in another example, process content in order to ensure that the content is sent to user device 110 in a manner that satisfies a quality of service (QoS) threshold. CDS 140 may, in yet another example, convert content into a format and/or protocol based on a type of user device 110. CDS 140 may process the content by sending the content, to user device 110, at a bandwidth, data rate, and/or packet size that maximizes network throughput without inducing congestion, jitter, and/or other conditions.

Content provider 150 may include any type or form of content provider. For example, content provider 150 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 150 may produce media streams (e.g., television broadcasts). A "media stream," as used herein, may refer to a stream of content that includes video content (e.g., a video stream), audio content (e.g., an audio stream), and/or textual content (e.g., a textual stream).

Service provider network 160 may include one or more wired and/or wireless networks via which user devices 110 communicate and/or receive content. For example, service provider network 160 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. In another example, service provider network 160 may include a code division multiple access (CDMA) network and/or devices, a global system for mobile communications (GSM) network and/or devices, a general packet radio services (GPRS) network and/or devices, or a combination of a CDMA, GSM, GPRS networks. Additionally, or alternatively, service provider network 160 may include a wide area network (WAN), a metropolitan area network (MAN), an ad hoc network, an intranet, a fiber optic-based network (e.g., a fiber optic service (FiOS) network), and/or a combination of these or other types of networks.

Network 170 may include one or more wired and/or wireless networks. For example, network 170 may include a cellular network, the PLMN, a 2G network, a 3G network, a 4G network (e.g., an LTE network), a 5G network, and/or another network. Additionally, or alternatively, network 170 may include a WAN, a MAN, a telephone network (e.g., the Public Switched Telephone Network (PSTN)), an ad hoc network, an intranet, the Internet, a fiber optic-based network (e.g., a FiOS network), and/or a combination of these or other types of networks.

Figure 2:
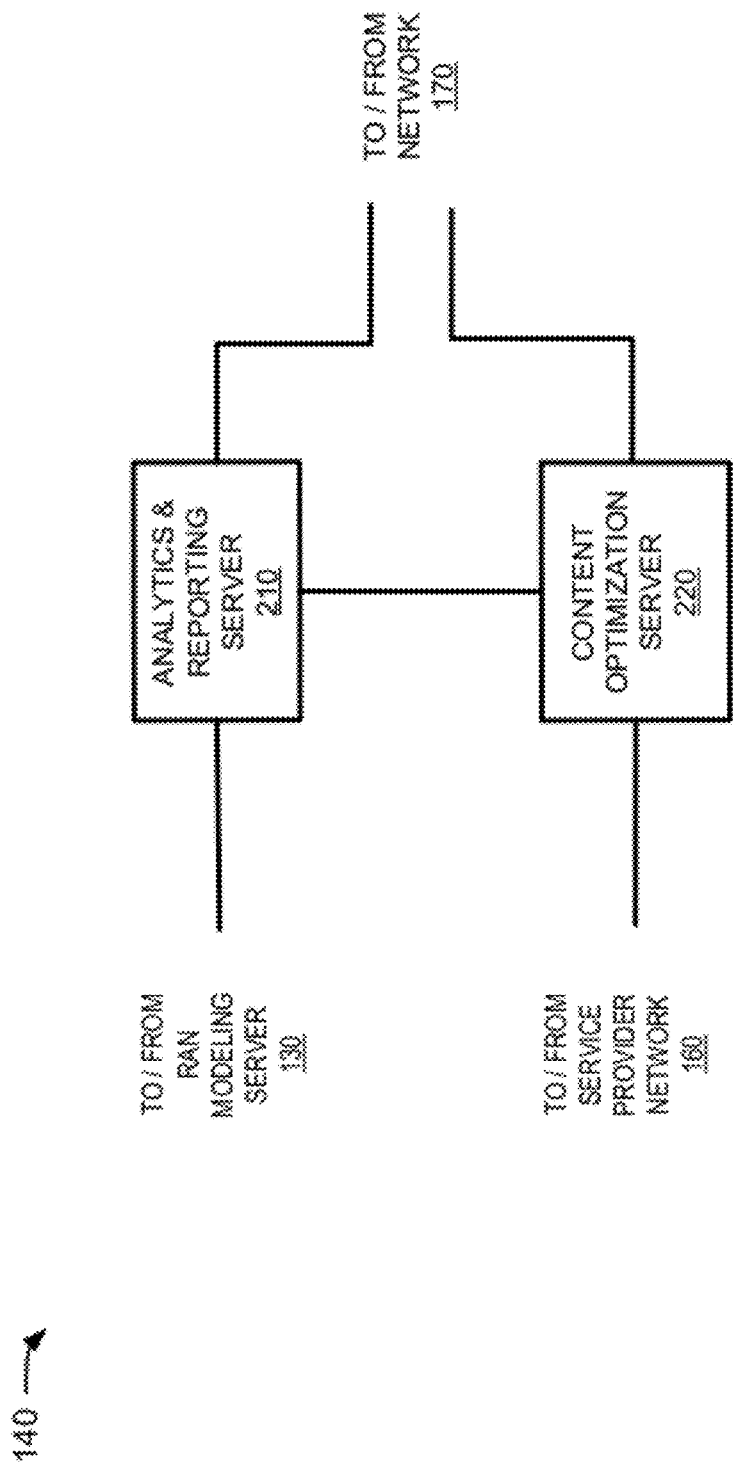
FIG. 2 is a diagram of example devices that may be associated with a content distribution system of FIG. 1.

FIG. 2 is a diagram of example devices of CDS 140. CDS 140 may include an analytics and reporting (AR) server 210 and a content optimization (CO) server 220. Although FIG. 2 shows example devices of CDS 140, in other implementations, CDS 140 may include fewer devices, additional devices, different devices, or differently arranged devices than depicted in FIG. 2. Additionally, or alternatively, one or more devices of CDS 140 may perform one or more tasks described as being performed by one or more other devices of CDS 140.

AR server 210 may include one or more server devices, or other types of computation or communication devices, that gather, process, search, store, and/or provide information in a manner similar to that described herein. In one example implementation, AR server 210 may determine whether a condition exists within a RAN associated with service provider network 160.

AR server 210 may receive information associated with traffic being transported, via cells within the RAN, between service provider network 160 and user devices 110. AR server 210 may retrieve, from a memory associated with AR server 210, policy information associated with the RAN. The policy information may, in one example, identify thresholds associated with a maximum quantity of bandwidth that the cells can transport before becoming congested. In another example, the policy information may identity a threshold associated with a respective maximum quantity of user devices 110 that can be served by each of the cells.

The policy information may also include information associated with a time period (such as, for example, during working hours) when a traffic load is expected to be at a peak level (e.g., greater than a threshold) and/or another time period (such as, for example, during non-working hours) when the traffic is not expected to be at the peak level (e.g., not greater than the threshold), etc. The policy information may also include information associated with traffic obtained at a prior time period and/or information associated with conditions detected at the prior time period. AR server 210 may use the information, associated with the traffic and/or the conditions, obtained from the prior time period, to identify trends associated with the traffic. For example, a trend may be identified based on a determination of whether a quantity of bandwidth, associated with a cell, is increasing, is unchanged, or is decreasing. AR server 210 may forecast that a condition may occur at a future point in time based on a rate at which the bandwidth is increasing relative to a bandwidth threshold.

In another example, another trend may be identified by determining whether a quantity of user devices 110 being served by the cell is increasing, is unchanged, or is decreasing. The other trend associated with the quantity of user devices 110 being served by the cell may be used to determine whether a condition exists or is forecasted to exist at a future point in time. In yet another example, a further trend may be identified by determining whether a quantity of video streaming sessions is increasing, is unchanged, or is decreasing. The further trend, associated with the quantity of streaming video sessions, may be used to determine whether a condition exists or is forecasted to exist at a future point in time. Based on a determination that a condition exists, AR server 210 may send a notification to CO server 220 that indicates that a condition exists and/or is forecasted to exist at a future point in time.

In another example implementation, AR server 210 may present, for display via a user interface (UI), information associated with a network topology associated with the RAN and/or service provider network 160. The information associated with the network topology may include objects that identify locations, within a geographical area, that represent locations of network devices and/or other information associated with the RAN. For example, the information associated with the network topology may identify a respective location for each of base stations 120 within the RAN. In another example, the information associated with the network topology may identify respective cells associated with each of base stations 120.

AR server 210 may display, via the UI, information associated with the traffic relative to each of the cells within the RAN, For example, for a particular cell, the UI may display information that identifies a traffic load (e.g., a bandwidth, a throughput, etc) associated. with a particular cell, quantity of user devices 110 being served by the cell, an indication whether a condition is associated with the particular cell, a quantity of reserve capacity (e.g., reserve bandwidth, etc.) associated with the cell, a trend associated with the traffic load, etc.

CO server 220 may include one or more server devices, or other types of computation or communication devices, that gather, process, search, store, and/or provide information in a manner similar to that described herein. In one example implementation, CO server 220 may perform content optimization operations on content being served to user devices 110. For example, CO server 220 may process content, destined for user device 110, to maximize throughput and/or avoid congestion while being transported over service provider network 160 and/or the RAN associated with service provider network 160. CO server 220 may, in another example, process the content to meet a level of QoS specified in a service level agreement (SLA) associated with a particular content provider 150 from which the content originates. CO server 220 may, in yet another example, convert the content to a format, based on a type of user device 110, that enables the content to be received, processed, and/or rendered on user device 110 within a period of time that is less than a threshold.

CO server 220 may receive a notification from AR server 210 that indicates that a condition, associated with one or more cells and/or base station 120 within the RAN, exists or is forecasted to exist at a future point in time. CO server 220 may, in response to the notification, cause content to be served to user device 110 in a manner that minimizes and/or avoids the condition on a RAN. The notification may, in one example, indicate that streaming video (e.g., being served to user device 110 via a cell associated with base station 120) is being served at a data rate that is causing, or is forecasted to cause, congestion within the cell. CO server 220 may, in response to the notification, down rate (e.g., decrease) the data rate and/or another data rate associated with streaming video being served to other user devices 110. Further, CO server 220 may down rate the data rate to a level that is less than a threshold. The threshold may be identified, by CO server 220 and/or AR server 210, as a level that reduces and/or remedies the congestion while maintaining a QoS, associated with the video stream and/or the other media streams (e.g., greater than a QoS threshold). The threshold may, in another example, be identified as a level in which a user, of the user device, does not perceive a reduction in video quality when the video is served at the down rated data rate.

In another example, CO server 220 may, in response to the notification, serve content to user device 110 by resizing packets, associated with the content. Resizing the packets may enable the content to be more efficiently served to user devices 110. For example, CO server 220 may process the packets in a manner that conforms to a maximum transmission unit (MTU) associated with service provider network 160. Processing the packets in the manner that conforms to the MTU may permit the content to be served at a maximum data rate (e.g., greater than another threshold) while avoiding congestion within service provider network 160 and/or the RAN associated with service provider network 160.

CO server 220 may process the packets by performing packet and/or header compression. The packets may be resized and/or compressed to achieve a maximum bandwidth and/or data transfer rate while avoiding congestion and serving the content to user device 110.

Figure 3:
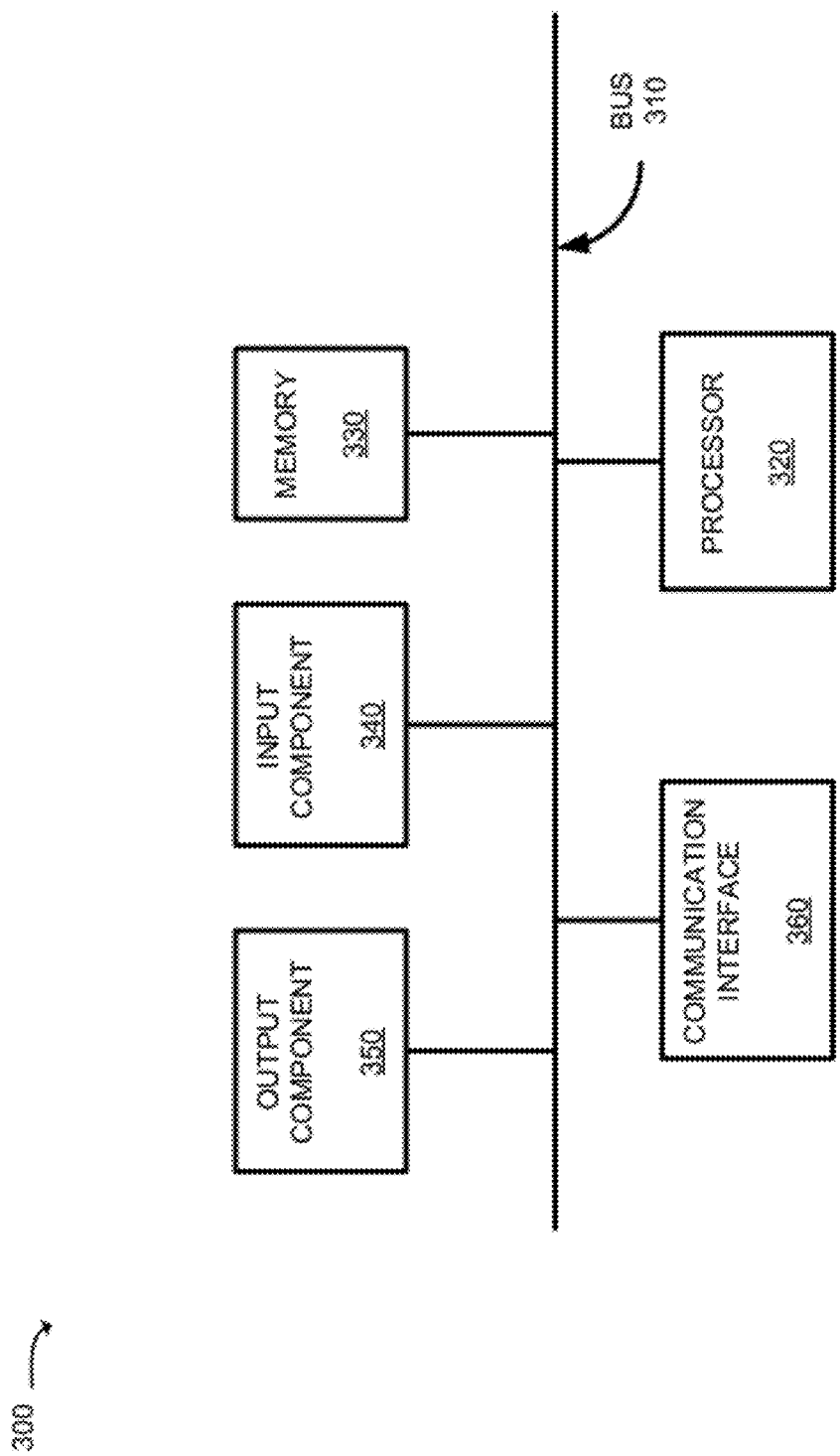
FIG. 3 is a diagram of example components of one or more of the devices of FIGS. 1 and 2.

FIG. 3 is a diagram of example components of a device 300 that may correspond to user device 110, base station 120, RAN modeling server 130, content provider 150, AR server 210, and/or CO server 220. Alternatively, each of user device 110, base station 120, RAN modeling server 130, content provider 150, AR server 210, and/or CO server 220 may include one or more devices 300. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as service provider network 160 and/or network 170. In one alternative implementation, communication interface 360 may be a logical component that includes input and output ports, input and output systems, and/or other input and output components that facilitate the transmission of data to other devices.

As will be described in detail below, device 300 may perform certain operations relating to RAN modeling and condition detection within a RAN associated with service provider network 160. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example data structure 400 that stores information associated with traffic being transported, to and/or from user device 110, via a RAN associated with service provider network 160. RAN server 130 may monitor the traffic and may obtain information, associated with the traffic, for storage in data structure 400. Data structure 400 may include a collection of fields, such as a user device (UD) identifier (ID) field 405, a source address field 410, a base station identifier (ID) field 415, a cell identifier (ID) field 420, a user device (UD) status field 425, a flow type field 430, a traffic toad field 435, a hand in field 440, and a hand off field 445. Data structure 400 includes fields 405-445 for explanatory purposes. In practice, data structure 400 may include additional fields, fewer fields, different fields, or differently arranged fields than are described with respect to data structure 400.

UD ID field 405 may store information associated with user device 110 that communicates with service provider network 160. For example, the information, associated with user device 110, may include a device identifier (e.g., a mobile directory number (MDN), an electronic serial number (ESN), a subscriber identity module (SIM) universal resource identifier (URI), an international mobile subscriber identifier (IMSI), and/or other identifiers). Source address field 410 may store a network address (such as, for example, an IP address, a media access control (MAC) address, a telephone number, etc.) associated with user device 110.

Base station ID field 415 may store information associated with base station 120 via which user device 110 communicates with service provider 160. Cell ID field 420 may store information associated with a particular cell, associated with base station 120, that serves user device 110 when communicating with service provider network 160. UD status field 425 may store an indication regarding whether user device 110 is actively communicating with service provider network 160. For example, UD status field 425 may store an indication that user device 110 is present (e.g., powered up) on the RAN and actively communicating. In another example, UD status field 425 may store an indication that user device 110 is present on the RAN, but is not actively communicating. In yet another example, UD status field 425 may store an indication that user device is not present on the RAN, such as, for example, when user device 110 is not powered up and/or is not located within a cell associated with the RAN.

Flow type field 430 may identify the manner in which user device 110 is communicating with service provider network 160. For example, flow type field 430 may store an indication that user device 110 is receiving streaming video via the particular cell and/or base station 120. In another example, flow type field may store an indication that user device 110 is associated with a call session and/or message session (e.g., using a short message service (SMS) protocol, a multimedia message service (MMS) protocol, an IM protocol, an email protocol, etc.) with another user device 110 via the particular cell and/or base station 120, etc. Traffic load field 435 may store information associated with a bandwidth and/or data rate associated with a flow to and/or from user device 110 at a point in time or over a period of time.

Hand in field 440 may store information associated with a cell (e.g., associated with base station 120 or another base station 120) from which user device 110 was handed over at a prior point in time (e.g., prior to a time when user device 110 was "handed in" and/or had begun communicating via the particular cell). Hand off field 445 may store information associated with another cell (e.g., associated with base station 120 or another base station 120) to which user device 110 is to be handed over at a future point in time (e.g., after a time when user device 110 is "handed out" and/or begins communicating with the other cell).

RAN server 130 may monitor traffic being transported via one or more cells associated with one or more base stations 120 within the RAN and may store information, associated with traffic being transported to and/or from user device 110, in data structure 400. For example, RAN server 130 may store information associated with base station 120 (e.g., 120-1) and/or an identifier associated with a cell (e.g., 1-C1) associated with base station 120 (e.g., shown as ellipse 450). RAN server 130 may monitor packets associated with flows being transported via the cell and may obtain, from the packets, information associated with user device 110 such as, for example, a device identifier (e.g., IMSI-1) and/or a source address (e.g., IP1) (e.g., as shown by ellipse 450). RAN server 130 may, based on the packets, determine that user device 110 is present on the cell (e.g., active) and may identify a type of flow (e.g., streaming video) that is associated with user device 110 (e.g., as shown by ellipse 450). RAN server 130 may identify a traffic load, such as, for example, a quantity of bandwidth, a data rate, etc. (e.g., BW-1) relating to the flow associated with user device 110 (e.g., as shown by ellipse 450). RAN server 130 may determine that user device 110 may be handed off to another cell (e.g., 1-C2) at a future point in time (such as, for example, when user device 110 moves closer to the other cell and/or moves out of range of the cell) (e.g., as shown by ellipse 450). RAN server 130 may obtain information associated with other traffic that is being transported via other cells and/or base stations 120 within the RAN (e.g., as shown by ellipse 452).

Figure 5:
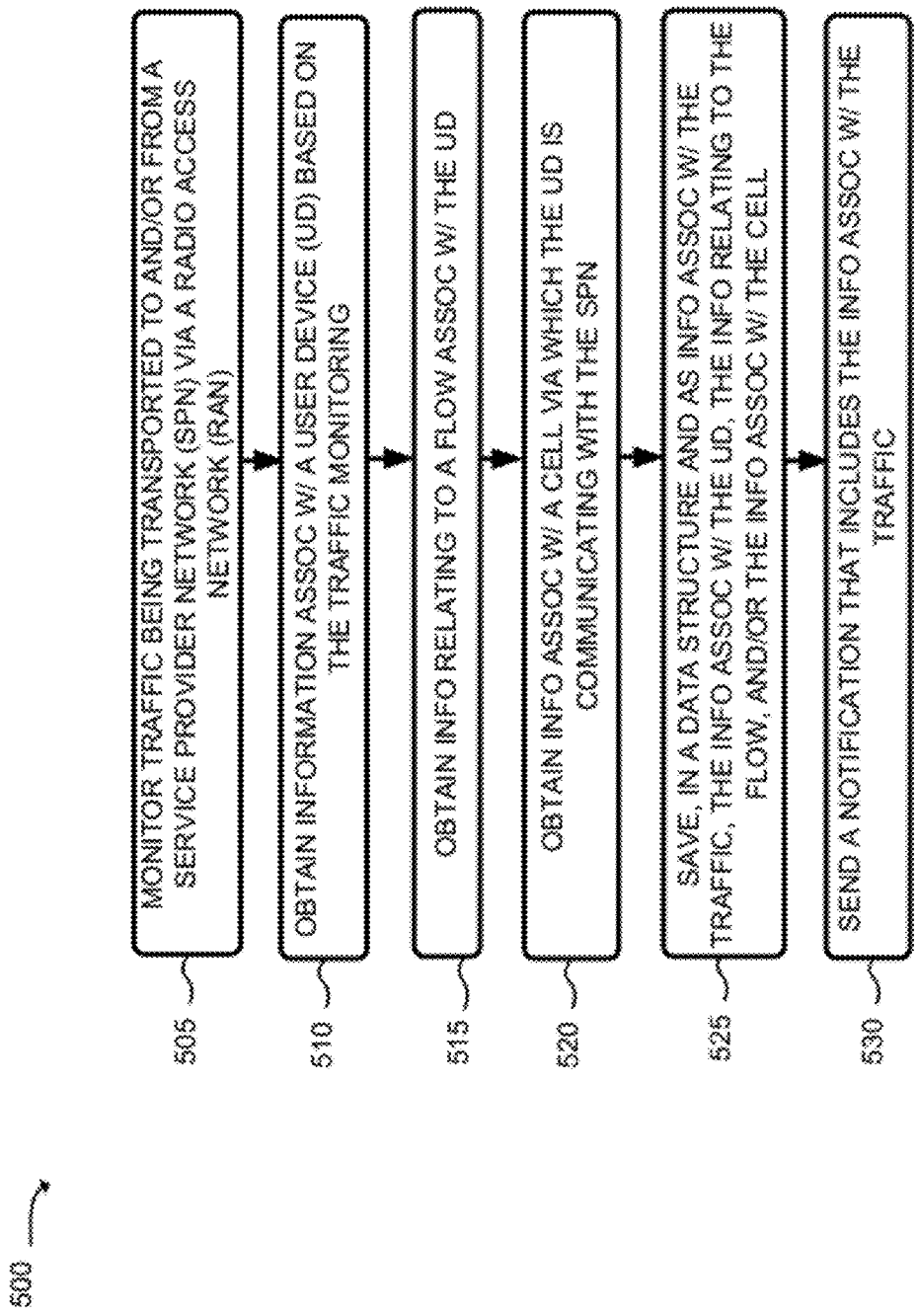
FIG. 5 is a flow chart of an example process for obtaining information associated with traffic being transported to and/or from a user device via a radio access network.

FIG. 5 is a flow chart of an example process 500 for obtaining information associated with traffic being transported to and/or from user device 110 via a RAN associated with service provider network 160. In one example implementation, process 500 may be performed by RAN server 130. In another example implementation, some or all of process 500 may be performed by a device or collection of devices separate from, or in combination with, RAN server 130.

As shown in FIG. 5, process 500 may include monitoring traffic being transported to and/or from a service provider network via a RAN (block 505). For example, RAN server 130 may monitor packets being transported via a RAN associated with service provider network 160. In one example, RAN server 130 may monitor packets being transmitted via interfaces associated with signal bearers (such as, for example, an S1-U interface) via which user device 110 communicates with service provider network 160. In another example, RAN server 130 may monitor one or more interfaces associated with control-plane signaling (such as, for example, an S11 interface when establishing or executing a communication session and/or an S10 interface during a handover event). When monitoring the packets, RAN server 130 may inspect a portion of the packets (e.g., a header portion, a trailer portion, a label portion, etc.) that does not include a payload portion of the packets. In another example implementation, RAN server 130 may inspect any portion of the packets (e.g., headers, trailers, labels, payloads, etc.).

As also shown in FIG. 5, process 500 may include obtaining information associated with a user device based on the traffic monitoring (block 510) and obtaining information relating to a flow associated with the user device (block 515). For example, RAN server 130 may obtain, as a result of the packet monitoring, information associated with user device 110, such as a device identifier (e.g., a MDN, an ESN, a SIM URI, an IMSI, and/or other identifiers) and/or a source address (e.g., an IP address, a MAC address, etc.). RAN server 130 may identify whether user device 110 is actively communicating with service provider network 160 as a result of the packet monitoring (e.g., based on a data rate, a bandwidth, a packet type, etc.). RAN server 130 may also identify a type of flow relating to user device 110. For example, the type of flow may include, but is not limited to, streaming video, progressive download, a call, a message (e.g., based on an SMS protocol, MMS protocol, IM protocol, email protocol, etc.), a data session, etc. RAN server 130 may identify a traffic load associated with the flow by identifying a quantity of bandwidth and/or a data rate associated with the flow.

As further shown in FIG. 5, process 500 may include obtaining information associated with a cell via which the user device is communicating with the service provider network (block 520). For example, RAN server 130 may, as a result of monitoring the packets associated with the traffic, identify a cell via which user device 110 is communicating with service provider network 160. RAN server 130 may identify base station 120 with which the cell is associated. RAN server 130 may, in another example, determine whether user device 110 is being handed over from another cell to the cell (e.g., being handed in to the cell) and/or is being handed over from the cell to a further cell (e.g., being handed out to the further cell).

As yet further shown in FIG. 5, process 500 may include saving, in a data structure and as information associated with the traffic, the information associated with the user device, the information relating to the flow, and/or the information associated with the cell (block 525) and sending a notification that includes the information associated with traffic as a result of the monitoring the traffic (block 530). For example, RAN server 130 may store information associated with the traffic in a data structure that is stored in a memory associated with RAN server 130. The information associated with the traffic may include the information associated with the user device 110 (e.g., the device identifier, the network address, a status of user device 110, etc.). The information associated with the traffic may include the information relating to the flow associated with user device 110 (e.g., the flow type, a traffic load associated with the flow, etc.). The information associated with the traffic may include the information associated with the cell (e.g., a cell ID, a base station ID, another cell ID from which user device is being handed in, a further cell ID to which user device 110 is being handed over, etc.).

RAN modeling server 130 may send a notification to AR server 210 that indicates that information associated with the traffic has been obtained for user device 110 and/or the cell. The notification may include the information associated with the traffic and/or information associated with other traffic. The information associated with the other traffic may correspond to one or more other user devices 110 and/or cells associated with the RAN.

Figure 6:
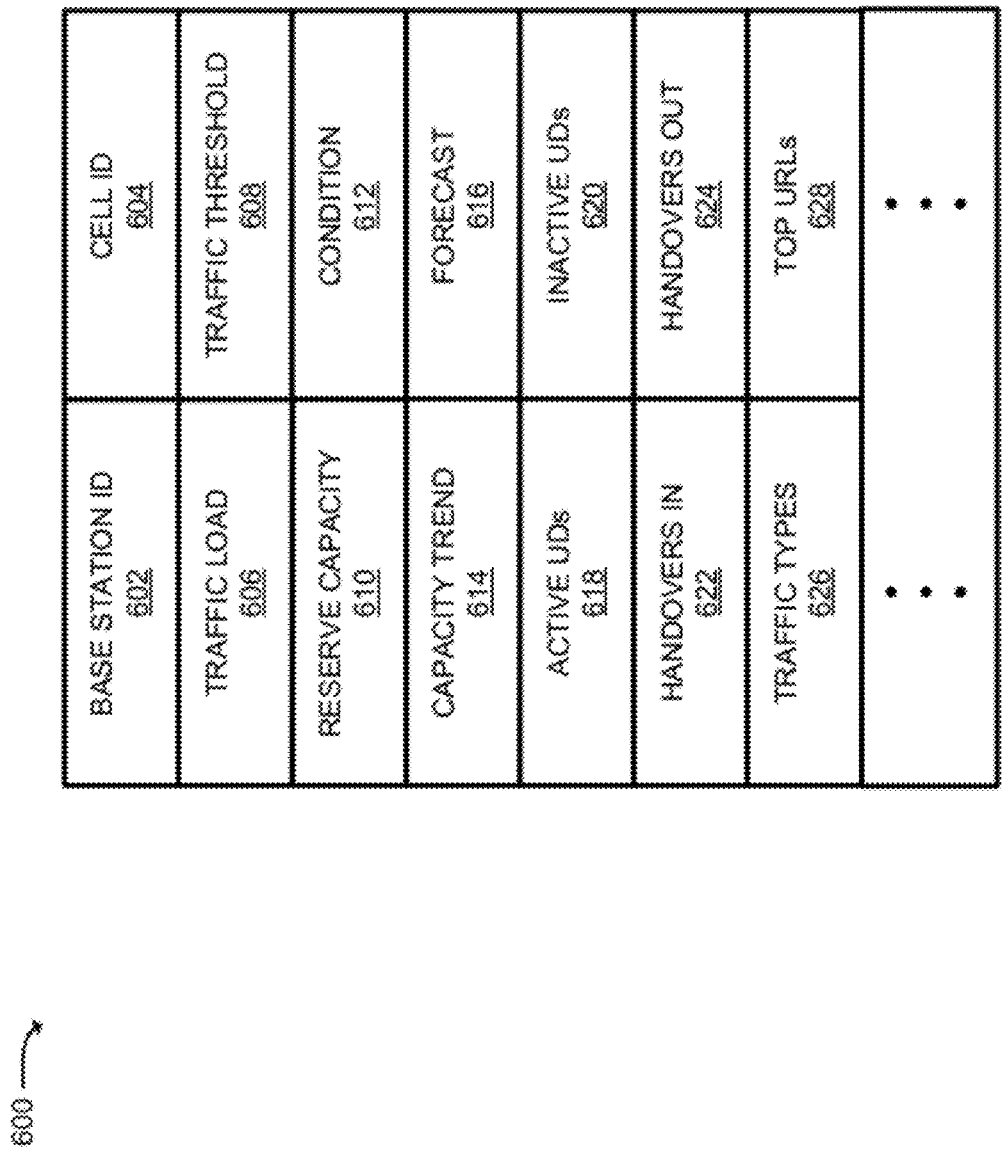
FIG. 6 is a diagram of an example data structure that stores information associated with traffic being transported via a cell associated with a radio access network.

FIG. 6 is a diagram of an example data structure 600 that stores information associated with traffic being transported via a cell within a RAN associated with service provider network 160. AR server 210 may receive information associated with traffic being transported to and/or from one or more user devices 110 via a cell within the RAN. AR server 210 may store the information associated with the traffic being transported, via the cell, in data structure 600. Data structure 600 may include a collection of fields, such as a base station identifier (ID) field 602, a cell identifier (ID) field 604, a traffic load field 606, a traffic threshold field 608, a reserve capacity field 610, a condition field 612, a capacity trend field 614, a forecast field 616, an active user devices (UDs) field 618, an inactive user devices (UDs) field 620, a handovers in field 622, a handovers out field 624, a traffic types field 626, and a top uniform resources locators (URLs) field 628. Data structure 600 includes fields 602-628 for explanatory purposes. In practice, data structure 600 may include additional fields, fewer fields, different fields, and/or differently arranged fields than are described with respect to data structure 600.

Base station ID field 602 may store information associated with base station 120 with which a particular cell, within the RAN, is associated. Cell ID field 604 may store information associated with the particular cell (such as, for example, a cell ID) from which the information associated with the traffic, being transported via the particular cell, is obtained.

Traffic load field 606 may store information associated with a traffic load that corresponds with the particular cell. For example, RAN server 130 may store information associated with a traffic load (e.g., bandwidth and/or data rate) being transported via the particular cell at a point in time or over a period of time. The traffic load may pertain to traffic associated with one or more user devices 110 being served by the particular cell. Traffic threshold field 608 may store information associated with a threshold for the particular cell. The threshold may, for example, identify a maximum quantity of traffic (e.g., bandwidth and/or data rate) that can be served via the particular cell without becoming congested. In another example, the threshold may correspond to a maximum quantity of user devices 110 that can be served by the particular cell. In yet another example, the threshold may correspond to a maximum processing capacity of a central processing unit (CPU) associated with base station 120 (such as, for example, processor 320 of FIG. 3).

Reserve capacity field 610 may store information associated with a quantity of capacity that is not being used by base station 120. The quantity of capacity that is not being used may identify a quantity of additional traffic load (e.g., additional bandwidth, data rate, etc.) that can be transported via the particular cell without causing congestion. In another example, the quantity of capacity that is not being used may identify a quantity of additional user devices 110 that can be served by the particular cell and/or a quantity of additional processing capacity, associated with base station 120, that can be used without causing congestion.

Condition field 612 may store an indication regarding whether a condition (such as, for example, congestion, jitter, dropped packets, etc.) exists with respect to the particular cell. In one example, condition field 612 may store an indication that the particular cell is congested when a quantity of reserve capacity is less than a threshold. Capacity trend field 614 may store information associated with whether a quantity of reserve capacity is increasing, is decreasing, or is neither increasing nor decreasing. Forecast field 616 may store information that identifies whether a condition is forecasted to occur at a future time and/or a future period of time. Forecasting whether the condition is to occur may be based on the traffic load, the reserve capacity, and/or a trend with respect to the traffic load and/or the reserve capacity.

Active UDs field 618 may store information associated with a quantity of user devices 110 that are actively communicating via the particular cell. Inactive UDs 620 may store information associated with a quantity of user devices 110 that are present in the particular cell, but are not actively communicating via the particular cell. Handovers in field 622 may store information associated with a quantity of user devices 110 that are being handed in from another cell to the particular cell. The quantity of user devices 110 being handed in from the other cell to the particular cell may be an indication of a quantity of additional traffic load that the particular cell is to transport over a future period of time. Handovers out field 624 may store information associated with a quantity of user devices 110 that are being handed out from the particular cell to another cell. The quantity of user devices 110 being handed out from the particular cell to the other cell may be an indication of a decrease in a quantity of traffic load that the particular cell is to transport over a future period of time. Additionally, a comparative quantity of hand ins versus a quantity of hand outs may be an indication of whether a traffic load is expected to increase, decrease, or neither increase nor decrease.

Traffic types field 626 may store information associated with a respective quantity of each traffic type being transported via the particular cell. For example, traffic types field 626 may store a quantity of flows associated with streaming video. In another example, traffic types field 626 may store another quantity of flows associated with instant messaging (e.g., SMS, MMS, etc.) email messaging (e.g., based on an email protocol, etc). In yet another example, traffic types field 626 may store a further quantity of flows associated with calls being routed via the particular cell. Top URLs field 628 may store information associated with the most popular URLs (e.g., top five, top ten, top twenty, top fifty, etc.) associated with traffic being transported via the particular cell.

Figure 7:
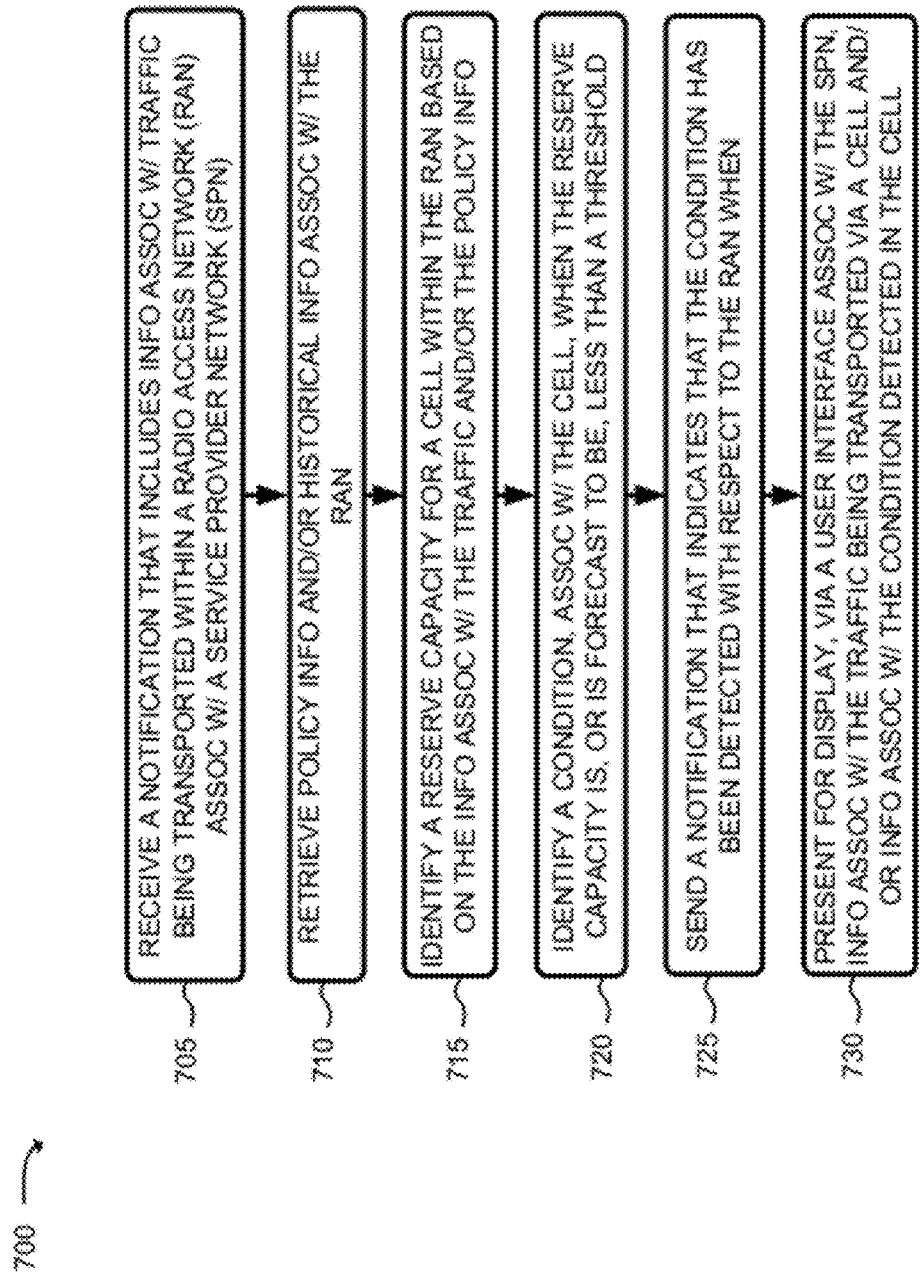
FIG. 7 is a flow chart of an example process for identifying whether a traffic condition exists within a radio access network associated with a service provider network.

FIG. 7 is a flow chart of an example process 700 for identifying whether a traffic condition exists within a RAN associated with service provider network 160. In one example implementation, process 700 may be performed by AR server 210. In another example implementation, some or all of process 700 may be performed by a device or collection of devices separate from, or in combination with, AR server 210.

As shown in FIG. 7, process 700 may include receiving a notification that includes information associated with traffic that is being transported within a RAN associated with a service provider network (block 705) and retrieving policy information and/or historical information associated with the RAN (block 710). For example, AR server 210 may receive one or more notifications from RAN server 130 that include information associated with traffic corresponding to one or more user devices 110. The traffic corresponding to the one or more user devices 110 may be transported via a cell, associated with base station 120, within a RAN associated with service provider network 160. The information associated with the traffic corresponding to the user devices 110 may include all or a portion of information stored in one or more data structures 400 (FIG. 4) for each of user devices 110. AR server 210 may use the information, obtained from the one or more notifications, to update information associated with traffic, being transported via the cell, that is stored within a data structure (e.g., data structure 600 of FIG. 6).

AR server 210 may, in respons' o the notification, retrieve policy information associated with a RAN with which base station 120 is associated. The policy information may include, for example, a threshold associated with a maximum traffic load that base station 120 and/or the cell can transport without becoming congested. In another example, the policy information may include another threshold associated with a maximum quantity of user devices 110 that can be served by the cell and/or a maximum processing capacity associated with base station 120 with respect to the cell.

AR server 210 may also retrieve historical information, associated with the RAN, in response to the notification. The historical information may include information associated with a period of time (e.g., a peak time period) during which traffic load is usually greater than a peak level (e.g., during business hours) and/or another period of time (e.g., an off-peak time period) during which the traffic load is not greater than the peak level (e.g., during non-business hours). The historical information may also include information that identifies circumstances, at a prior period of time, during which a condition was detected on the RAN. The circumstances may include information associated with a state of the RAN hen a condition was detected, such as when one or more base stations 120 were malfunctioning which cause a reserve capacity within other base stations 120 to decrease to a level that is less than a threshold, In another example, the information associated with the circumstances may identify a condition that was detected when a particular quantity of video streams (e.g., greater than a threshold) were being served over a period of time. yet another example, the information associated with the circumstances may identify a condition that was detected when a quantity of hand ins were greater than a quantity of hand outs by another threshold, etc.

As also shown in FIG. 7, process 700 may include identifying a reserve capacity for the cell, within the RAN, based on the information associated with the traffic and/or the policy information (block 715). For example, AR server 210 may obtain a value, relating to a traffic threshold associated with the cell, from the policy information. AR server 210 may obtain another value, relating to a traffic load being transported via the cell, from the information associated with the traffic being transported via the cell. AR server 210 may determine a quantity of reserve capacity ($T_{RESERVE}$) associated with the cell. The reserve capacity may be based on a difference between the value relating to the traffic threshold ($T_{THRESHOLD}$) and the other value relating to the traffic load (e.g., $T_{LOAD}$) (e.g., where $T_{RESERVE} = T_{THRESHOLD} - T_{LOAD}$).

In one example, the traffic threshold may correspond to a maximum bandwidth and/or data rate associated with the cell and the traffic load may correspond to a quantity of bandwidth and/or a data rate that is being transported via the cell. The reserve capacity, in this example, may be based on a difference between the maximum bandwidth and/or data rate and the quantity of bandwidth and/or the data rate, respectively, that is being transported via the cell.

As further shown in FIG. 7, process 700 may include identifying a condition, associated with the cell, when the reserve capacity is, or is forecasted to be, less than a condition threshold (block 720). For example, AR server 210 may compare the quantity of reserve capacity with a reserve capacity threshold (e.g., obtained from the policy information) associated with the cell. In one example, AR server 210 may determine that the quantity of reserve capacity is not less than the reserve capacity threshold. In another example, AR server 210 may determine that the quantity of reserve capacity is less than the threshold. Based on a determination that the quantity of reserve capacity is less than the reserve capacity threshold, AR server 210 may determine that a condition does not exist with respect to the cell.

In yet another example, AR server 210 may compare the quantity of reserve capacity to another quantity of reserve capacity, from a prior point in time (e.g., obtained from the historical information) to identify a trend associated with the quantity of reserve capacity. In one example, AR server 210 may determine that the other quantity of reserve capacity is less than the quantity of reserve capacity. Based on the determination that the other quantity of reserve capacity is less than the quantity of reserve capacity, AR server 210 may determine that the quantity of reserve capacity is increasing. In another example, AR server 210 may determine that the other quantity of reserve capacity is approximately equal to the quantity of reserve capacity. Based on the determination that the other quantity of reserve capacity is approximately equal to the quantity of reserve capacity, AR server 210 may determine that the quantity of reserve capacity is neither increasing nor decreasing. In yet another example, AR server 210 may determine that the other quantity of reserve capacity is greater than the quantity of reserve capacity. Based on the determination that the other quantity of reserve capacity is greater than the quantity of reserve capacity, AR server 210 may determine that the quantity of reserve capacity is decreasing.

AR server 210 may forecast that a condition may exist at a future point in time. For example, AR server 210 may determine that the quantity of reserve capacity is decreasing and may forecast that a condition may be triggered at a future point in time. The future point in time may be based on a rate at which the quantity of reserve capacity is decreasing. In another example, the future point in time may be based on a determination that the quantity of reserve capacity is likely to continue to decrease when a traffic load is projected to be above a peak threshold (e.g., obtained from the historical information) at the future point in time. In another example, AR server 210 may project that a condition may exist at another future point in time based on a determination that a quantity of user devices 110 that are being served via the cell, is expected to increase. The determination that the quantity of user devices 110 is expected to increase may be based on a determination that a quantity of hand ins to the cell is greater than a quantity of hand outs from the cell. The quantity of hand ins and/or hand outs may be obtained from the information associated with the traffic being transported via the cell.

As still further shown in FIG. 7, process 700 may include sending a notification indicating that a condition has been detected with respect to the RAN (block 725). For example, AR server 210 may, based on a determination that a condition exists with respect to the RAN, send a notification to CO server 220. The notification may indicate that the condition has been detected. In one example, the notification may include all or a portion of the information associated with the traffic that is being transported via the cell (e.g., that is stored in data structure 600 of FIG. 6). The information associated with the traffic may include, for example, a type of condition detected within the cell (e.g., based on a cell identifier), a traffic load associated with the cell, and/or a reserved capacity associated with the cell. In another example, the information associated with the traffic may include a forecast time at which a condition is expected to be triggered and/or a trend associated with the reserve capacity, the traffic load, a quantity of hand ins and/or hand outs, etc. In an example implementation, the notification may instruct CO server 220 to perform an operation to mitigate or remedy the condition (e.g., down rate a data rate associated with traffic being served via the cell, etc.).

As also shown in FIG. 7, process 700 may include presenting, for display via a user interface associated with a service provider network, information associated with traffic being transported via a cell and/or information associated with a condition detected in the cell (block 730). For example, AR server 210 may present, for display via a UI associated with service provider network 160, all or a portion of the information associated with the traffic that is being transported via the cell within the RAN. Additionally, or alternatively, AR server 210 may present, for display via the UI, information associated with the condition that was detected, and/or forecasted to occur, within the cell.

AR server 210 may present, for display via the UI, other information associated with traffic that is being transported via one or more other cells within the RAN. AR server 210 may present, for display via the UI, other information associated with one or more conditions that were detected, and/or forecasted to occur within the other cells.

Figure 8:
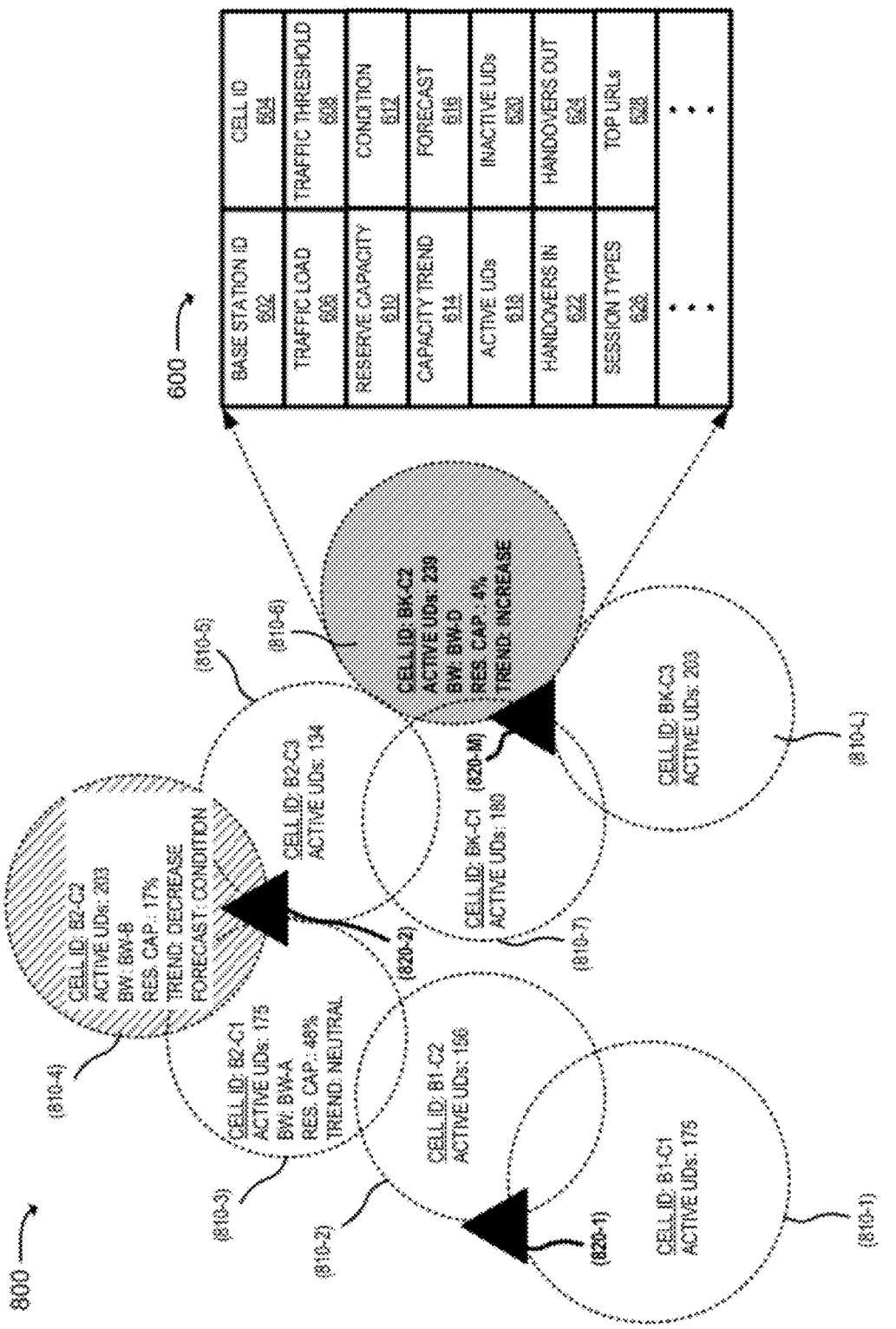
FIG. 8 is a diagram of an example user interface that displays information associated with traffic being transported via a radio access network.

FIG. 8 is a diagram of an example user interface (UI) 800 that may display information associated with traffic being transported via a RAN associated with service provider network 160. UI 800 may include a collection of objects, such as a group of cell objects 810-1,... 810-L (where L≥1) (hereafter referred to collectively as "cells 810" and individually as "cell 810") and a group of base station objects 820-1,..., 820-M (where M≥1) (hereafter referred to collectively as "base station objects 820" and individually as "base station object 820"). UI 800 includes objects 810 and 820 for explanatory purposes. In practice, UI 800 may include additional objects, fewer objects, different objects, or differently arranged objects than are described with respect to UI 800.

Cell 810 may represent a cell associated with base station 120 within a RAN associated with service provider network 160. Base station object 820 may represent base station 120 with which the cell is associated. For example, UI 800 may include a respective base station object 820 for each base station 120 within the RAN. Base station object 820 may occupy a relative location, within UI 800, that corresponds to a geographical location of base station 120 with which base station object 820 corresponds. For example, a relative location of a particular base station object 820 (e.g., base station object 820-1) within UI 800 may correspond to a relative location of base station 120-1 within a geographical area associated with the RAN. Each base station object 820 may be associated with one or more cells 810. For example, base station object 820-1 may be associated with cells 810-1 and 810-2. Further, cells 810-1 and 810-2 may correspond to a respective cell, associated with base station 120-1, within the RAN.

Each cell 810 may include information associated with traffic that is being transported via a cell with which cell 810 is associated. For example, cell 810-1 may include information associated with the cell (e.g., shown as cell ID: B1-C1) with which cell 810-1 is associated. Cell 810-1 may include information that identifies a quantity of user devices 110 (e.g., shown as active UDs: 175) that are actively communicating via the cell.

In another example, cell 810-3 may include information associated with another cell (e.g., cell ID: B2-C1) with which cell 810-3 is associated. In this example, AR server 210 may determine that a quantity of bandwidth that is being transported via the other cell is greater than a threshold. Based on a determination that the quantity of bandwidth is greater than a threshold, AR server 210 may present, for display via UI 800, additional information associated with traffic being transported via the other cell. For example, cell 810-3 may include information associated with the quantity of bandwidth (e.g., shown as BW: BW-A), a reserve capacity of the other cell (e.g., shown as Res. Cap.: 48%), and/or an indication of a trend associated with a quantity of reserve capacity (e.g., shown as neutral).

AR server 210 may cause UI 800 to change an appearance of cell 810 when a quantity of reserve capacity is less than a reserve capacity threshold. For example, AR server 210 may determine that a quantity of bandwidth, associated with cell 810-4, is greater than a threshold. AR server 210, in a manner similar to that described above, may display, via UI 800, additional information associated with the traffic being transported via a cell to which cell 810-4 corresponds. Additionally, or alternatively, AR server 210 may determine that a quantity of reserve capacity (e.g., shown as res. cap.: 17%) is less than the reserve capacity threshold. Based on the determination that the quantity of reserve capacity is less than the reserve capacity threshold, AR server 210 may cause an appearance of cell 810-4 to change (e.g., shown by the striped fill of the dashed circle associated with 810-4). The change in appearance may enable an operator, of AR server 210, to identify a cell associated with a likelihood, that a condition may occur, that is greater than a risk threshold. AR server 210 may display, via UI 800, a trend (e.g., shown as trend: decrease) associated with the quantity of reserve capacity associated with cell 810-4. Based on a determination that the trend indicates that the quantity of reserve capacity is decreasing, AR server 210 may include information associated with a forecast (e.g., shown as forecast: condition) that identifies that a condition, associated with cell 810-4, is forecasted to occur.

AR server 210 may cause UI 800 to change cell 810 to a particular appearance or cause cell 810 to make a particular sound when a condition, associated with a cell to which cell 810 corresponds, has been detected. For example, AR server 210 may determine that a condition is associated with a cell (e.g., cell ID: BK-C2) that corresponds to cell 810-6. AR server 210 may cause cell 810-6 to change to the particular appearance (e.g., a particular color, a particular font, a blinking feature, etc.) and/or make a particular sound (e.g., a buzz sound, a siren, etc.) based on the determination that the condition exists. Additionally, or alternatively, AR server 210 may cause a data structure (e.g., shown as data structure 600 of FIG. 6), associated with cell 810-6, to be displayed via UI 800 based on the determination that the condition exists. The data structure may store all or a portion of the information associated with the traffic that is being transported by the cell to which cell 810-6 corresponds. Displaying the data structure may enable the operator to perform an operation to remedy and/or mitigate the condition based on the information associated with the traffic that is displayed via the data structure. In another example implementation, an operator may use an input device (e.g., a mouse, a keyboard, etc.), to select a cell 810 to view a data structure that corresponds to a cell with which the selected cell 810 is associated.

Systems and/or methods, described herein, may enable information, associated with traffic being transported over a RAN, to be dynamically obtained on a real-time basis. The information associated with the traffic may be used to detect whether a condition, associated with the RAN, exists or is forecasted to exist at a future point in time. Based on the detection of the condition, the systems and/or methods may cause a notification to be sent that identifies the existence of the condition within the RAN, The systems and/or methods may enable information associated with the traffic that is transported via the RAN and/or information associated with a condition within the RAN to be displayed via a UI that includes a network topology of the RAN.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIGS. 5 and 7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a first server device associated with a radio access network (RAN) via which traffic is transported, between a service provider network and a plurality of user devices, via a plurality of cells respectively associated with a plurality of base stations in the RAN, the method comprising:
   monitoring, by the first server device, a plurality of packets associated with the traffic;
   identifying, by the first server device and as a result of the monitoring, multiple flows of packets associated with a number of the plurality of user devices being served by respective cells of the plurality of cells associated with one of the base stations;
   obtaining, by the first server device and from one or more flows of the multiple flows of packets, information associated with the respective cells;
   storing the information, associated with the respective cells, in a data structure containing a plurality of fields including:
      a field containing information associated with the number of user devices being served by the respective cells, including a status field for each of the user devices, wherein the status fields include:
         a first indication that a first user device is present on the RAN and actively communicating via the respective cell,
         a second indication that a second user device is present on the RAN and not actively communicating via the respective cell, and
         a third indication that a third user device is not present on the RAN,
      a field containing information associated with the respective cells, and
      a field containing information associated with a respective bandwidth that corresponds to each of the one or more flows; and
   transmitting, by the first server device, the data structure for presenting the information associated with the respective cells, via a user interface (UI), using a base station object and corresponding cell objects that indicate current conditions related to congestion in the respective cells, wherein:
      one or more of the corresponding cell objects indicate a traffic load, associated with the respective cells, which is greater than a first threshold that identifies a maximum amount of traffic before the respective cells become congested, wherein the traffic load is based on the respective bandwidth that corresponds to each of the one or more flows, and
      each of the corresponding cell objects indicates a quantity of user devices, of the number of user devices present in the respective cells, which are actively communicating with the service provider network via the respective cells, with respect to a second threshold that identifies a maximum number of user devices that can be served by each of the respective cells.

2. The method of claim 1, wherein monitoring the plurality of packets includes:
   monitoring two or more interfaces between the one base station and the service provider network, wherein the two or more interfaces include:
      a first interface associated with one or more signal bearers that enable the one or more flows to be transported via the service provider network, and
      a second interface associated with control-plane signaling that controls the one or more signal bearers to establish or execute communication sessions associated with the plurality of user devices.

3. The method of claim 2, wherein monitoring the two or more interfaces includes:
   monitoring the second interface to identify at least one user device, of the number of user devices, that is being handed over from one cell, of the respective cells, to another cell; and
   monitoring the second interface to identify at least one user device, of the number of user devices, that is being handed over from another cell to a further cell, of the respective cells.

4. The method of claim 1, wherein identifying the multiple flows of packets further includes:
   inspecting a respective portion of each of the plurality of packets exclusive of a payload portion of each of the plurality of packets.

5. The method of claim 1, wherein obtaining the information associated with the respective cells further includes:
   obtaining, from a particular flow of packets of the one or more flows of packets, information associated with a user device, of the number of user devices, and
   storing the information associated with the respective cells includes storing:

a device identifier associated with the user device, and
a source address associated with the user device.

6. The method of claim 1, wherein obtaining the information associated with the respective cells further includes:
obtaining, from a particular flow of packets, of the one or more flows of packets, information associated with the respective cells, and storing the information associated with the respective cells includes storing at least one of:
an identifier associated with the respective cells,
an identifier associated with the one base station,
information that identifies a first set, of the number of user devices, that have been handed over to the respective cells, or
other information that identifies a second set, of the number of user devices, that are to be handed over to the respective cells.

7. The method of claim 6, wherein transmitting the data structure enables a second server device, associated with the service provider network, to determine whether the quantity of active user devices is increasing, decreasing, or is neither increasing nor decreasing based on fields containing
a first quantity of user devices corresponding to the first set of the number of user devices, and
a second quantity of user devices corresponding to the second set of the number of user devices.

8. The method of claim 7, wherein transmitting the data structure enables the second server device to forecast whether the traffic load is expected to increase, decrease, or remain approximately the same based on fields containing:
a first quantity of bandwidth relating to flows of packets associated with the first quantity of user devices, and
a second quantity of bandwidth relating to other flows of packets associated with the second quantity of user devices.

9. The method of claim 1, wherein obtaining the information associated with the respective cells further includes:
obtaining information associated with one or more types of flows, wherein the information associated with the one or more types of flows includes a respective quantity of bandwidth associated with each of the one or more types of flows, and storing the information further includes storing information related to at least one of:
a first type of flow that corresponds to streaming video,
a second type of flow that corresponds to progressively downloaded video,
a third type of flow that corresponds to calls,
a fourth type of flow that corresponds to an instant messaging protocol,
a fifth type of flow that corresponds to an email-based messaging protocol, or
a sixth type of flow that corresponds to Internet website browsing.

10. The method of claim 9, wherein transmitting the data structure further includes:
transmitting, to a second server device associated with the service provider network, the information associated with the one or more types of flows to enable the second server device to identify which of the types of flows is causing the congestion in the respective cells.

11. The method of claim 1, wherein transmitting the data structure enables a second server device, associated with the service provider network, to:
display, via the user interface (UI), at least one of the data structure, the information associated with the one or more flows of packets, or the information associated with the respective cells, and wherein the UI includes information associated with a geographical area within which the RAN is located and information associated with a network topology associated with the RAN.

12. A computing device associated with a service provider network, the computing device comprising:
a memory to store policy information associated with a radio access network (RAN) via which a plurality of user devices communicate with the service provider network; and
one or more processors configured to:
monitor traffic being transported via respective cells, associated with a base station in the RAN, in which the plurality of user devices are present,
obtain traffic information associated with each cell, of the respective cells, as a result of monitoring the traffic,
store the traffic information in a data structure containing a plurality of fields that includes information associated with each cell and indicating a number of the plurality of user devices being served via each cell, including:
a status field for each of the user devices, wherein the status fields include:
a first indication that a first user device is present on the RAN and actively communicating via the respective cell,
a second indication that a second user device is present on the RAN and not actively communicating via the respective cell, and
a third indication that a third user device is not present on the RAN,
and at least one of:
a quantity of bandwidth, that corresponds to one or more traffic flows, associated with the number of user devices, or
one or more traffic types being served by each cell,
identify a condition, associated with one or more of the cells, when the quantity of bandwidth is greater than a bandwidth threshold that identifies a maximum amount of traffic before the one or more of the respective cells become congested, obtained from the policy information,
determine that another condition, associated with the one or more cells, exists when a quantity of the number of user devices is greater than another threshold that identifies a maximum number of user devices that can be served by each of the one or more of the respective cells, and
generate a user interface (UI) configured to:
present a plurality of cell objects corresponding to the respective cells, each of the cell objects including an indication of the number of user devices, and
selectively present in one or more of the cell objects:
an indication that the identified condition exists corresponding to a particular traffic type, of the one or more traffic types, to mitigate or remedy the identified condition,
the data structure, responsive to the determination that the identified condition exists, or to user input, and
an indication that the other condition exists.

13. The computing device of claim 12, wherein the one or more processors are further configured to:
change an appearance of the corresponding presented cell object to indicate that the other condition exists.

14. The computing device of claim 12, wherein the one or more processors are further configured to:
retrieve historical information associated with the RAN, obtain, from the historical information, information identifying a first quantity of user devices present in each cell at a prior point in time,
determine that a quantity of user devices, in each cell, is increasing, when the first quantity of user devices is less than a second quantity of user devices, associated with the number of user devices,
forecast that the other condition, associated with each cell, will exist at a future point in time based on the determination that the quantity of user devices is increasing, and
change an appearance of the corresponding presented cell object to indicate that the other condition will exist.

15. The computing device of claim 12, wherein, when monitoring the traffic being transported via the respective cells, the one or more processors are configured to:
monitor two or more interfaces between base stations, with which the respective cells are associated, and the service provider network, wherein the two or more interfaces include:
a first interface associated with one or more signal bearers that transport the one or more traffic flows via the service provider network, and
a second interface associated with control signals that controls the one or more signal bearers to establish or execute communication sessions that enable the number of user devices to communicate with the service provider network.

16. The computing device of claim 12, wherein, when obtaining the traffic information associated with each cell, the one or more processors are further configured to:
determine that a quantity of user devices, of the number of user devices, is increasing,
forecast that the other condition, associated with each cell, will exist at a future point in time based on the determination that the quantity of user devices is increasing, and
change an appearance of the one or more cell objects to indicate that the other condition will exist.

17. The computing device of claim 12, wherein the one or more processors are further configured to perform an operation that includes:
reducing a data rate, associated with at least a portion of the one or more traffic flows, to a level that remedies the identified condition, and
where reducing the data rate to the level that remedies the identified condition causes the quantity of bandwidth to be reduced to another level that is less than the bandwidth threshold.

18. The computing device of claim 12, wherein the one or more processors are further configured to perform an operation that includes:
compressing packets associated with at least a portion of the one or more traffic flows, or
resizing the packets, associated with the at least a portion of the one or more traffic flows, relative to a maximum transmission unit associated with the service provider network or the RAN, and
wherein compressing the packets or resizing the packets causes the quantity of bandwidth to be reduced to another level that is less than the bandwidth threshold.

19. The computing device of claim 12, wherein the one or more processors are further configured to:
display, via the user interface (UI), at least one of the traffic information, information associated with the identified condition, or information associated with the cell, wherein the UI includes:
information associated with a geographical area within which the RAN is located, and
information associated with a network topology associated with the RAN.

20. A content distribution system, associated with a service provider network, the content distribution system comprising:
a first server device configured to:
monitor traffic, associated with a plurality of user devices, being transported between the plurality of user devices and the service provider network via respective cells associated with a base station in a radio access network (RAN),
identify, from the traffic, a flow of packets associated with each of the plurality of user devices, as a result of monitoring the traffic,
obtain, from the flow of packets, information associated with the respective cells,
store, in a data structure containing a plurality of fields, the information associated with the respective cells, wherein the plurality of fields includes:
a field containing information associated with each user device, including a status field for each of the user devices, wherein the status fields include:
a first indication that a first user device is present on the RAN and actively communicating via the respective cell,
a second indication that a second user device is present on the RAN and not actively communicating via the respective cell, and
a third indication that a third user device is not present on the RAN,
a field containing information associated with the respective cells, and
a field containing information relating to a traffic load associated with the respective cells, and
output the data structure; and
a second server device configured to:
receive the data structure from the first server device,
identify, when a total traffic load, associated with the respective cells is greater than a threshold that identifies a maximum amount of traffic before the respective cells become congested, a condition with respect to the respective cells,
determine that another condition, associated with the respective cells, exists when a quantity of the plurality of user devices is greater than another threshold that identifies a maximum number of the plurality of user devices that can be served by each of the respective cells, and
output, via a user interface:
a notification that indicates that the identified condition exists and that enables the identification condition to be remedied based on the information associated with the respective cells, and
the data structure responsive to the identified condition, or to user input received with respect to cell objects representative of the respective cells.

21. The content distribution system of claim 20, wherein, when outputting the notification, the second server device is further configured to:
display, via the user interface (UI), information associated with a geographical area within which the RAN is located, information associated with a network topology that corresponds to the RAN, and information associated with the flow,
wherein the information associated with the network topology is displayed, via the cell objects of the UI, and wherein the information associated with the respective cells distinguishes the cell objects.

22. The content distribution system of claim 20, further comprising:
a third server device configured to:
receive the notification of the identified condition, and
perform an operation to mitigate or remedy the identified condition by reducing the total traffic load associated with the respective cells.

23. The content distribution system of claim 22, wherein, when performing the operation, the third server device is further configured to:
reduce a quantity of bandwidth associated with the flow of packets or one or more other flows of packets, wherein the one or more other flows of packets correspond to one or more other user devices.

24. The content distribution system of claim 22, wherein, when performing the operation, the third server device is further configured to:
compress packets associated with a portion of the total traffic load,
resize the packets, associated with the portion of the total traffic load, relative to a maximum transmission unit (MTU) associated with the service provider network or the RAN, or
reduce a data rate associated with the portion of the total traffic load, and
wherein the portion of the traffic load corresponds to a particular type of flow, the particular type of flow including at least one of:
streaming video content,
progressively downloaded video content,
streaming audio content, or
data content associated with a bandwidth that is greater than the other threshold.

* * * * *